2,823,127

PROCESS FOR MANUFACTURING STEAK PRODUCT

Glenn B. Gwilliam and Harold C. Howell, Jr., Boise, Idaho

No Drawing. Application February 24, 1956
Serial No. 567,480

4 Claims. (Cl. 99—107)

This invention relates to the manufacture of steaks through a process wherein beef normally not used for steaks is converted into highly acceptable steak form.

It has been proposed to tenderize naturally tough steaks by passing cut steak slices through so-called cubing machines wherein relatively sharp knives locally mascerate the meat to sever connecting fibers without dividing the steak into small pieces. These processes however will not satisfactorily tenderize the lowest grades of beef to which the invention is especially directed.

The invention on the other hand contemplates first grinding so-called low grade beef and rebuilding the ground mass into a steak product that has a definite steak-like texture and the general appearance and eatability of a natural steak cut from a better grade of beef. During this rebuilding process the ground meat is gently worked to develop a stringy strand or tendril structure and then subjected to repeated folding and localized compression to intermingle or knit the tendrils together so that the final product is coherent and nearly natural in appearance.

It is the major object of the invention therefore to provide a process for the manufacture of a steak product wherein low grade beef is first ground and then rebuilt into a steak product of coherent structure and generally natural steak appearance.

A further object of the invention is to provide a process for making a steak product wherein lean beef too tough for normal steak usage is ground and then rebuilt by mechanical working operations into a tender steak product having an intermingled coherent tendril texture.

It is a further object of the invention to provide a novel process for making a tender steak product from tougher natural beef wherein the natural beef is ground, gently worked to provide a stringly mass of tendrils, and then subjected to repeated folding and localized compression operations that shape the product and knit together the tendrils into a coherent but tender steak product.

According to the invention the process may be started using meat of the grades known as "cutter," "canner" or "utility." These are the tougher grades of beef graded according to the U. S. Department of Agriculture scale according to which canner is the lowest grade of beef, cutter is one grade above canner, and utility is the next grade of beef above cutter. These so-called lower grades of beef may be tough and fibrous but they usually have a good flavor often superior to the more tender highly regarded natural cuts of higher graded beef. The carcass is boned, and substantially all fat is removed so that only lean meat is used for starting the process.

The first step is to grind this lean beef much in the manner that ordinary hamburger is ground. It has been found satisfactory for example to run the beef through an ordinary grinder having about 1/8" holes which corresponds to the finest hamburger grind. Only one pass is usually necessary. This produces a ground mass of beef which consists of tiny bits or pieces of meat that are loose and substantially non-coherent and will readily separate. In the normal use of this ground mass for hamburger the mass is separated into firmed patties wherein the meat bits are merely compressed together somewhat.

In the invention however the ground meat mass is not compressed. Instead it is gently worked, preferably by hand although the same process step can be accomplished by machine. For example when the meat is worked manually a mass of about forty to fifty pounds of the aforementioned ground beef is placed in a pan and the operator works it gently by slowly running his hands down into the pan and bringing them up through the meat. Care should be taken not to pound, pat, squish or exert substantial pressure on the meat during this step. We have found that after a short period of such gentle mixing the texture of the ground mass starts to change and the meat bits begin to form distinct elongated strands or tendrils. These tendrils which are hair-like in size become more apparent and numerous as the gentle working continues, and they increase in length and stretch during this process step. The tougher the original beef and the leaner, the sooner and more distinct is the tendril formation.

The result of this step, which usually requires a man working at normal speed about ten minutes to accomplish, is a mass of meat which exhibits a definite texture of fine hair-like tendrils running at random throughout and this finishes the first step in rebuilding the meat into steak.

We do not know exactly why this gentle working of the ground mass results in the definite tendril structure, but it is thought that such may be the result of flow characteristics of the particles of worked meat whereby the short fibres of the meat bits tend to align in the flow direction during gentle working and the adhesive components of the blood and other juices of the ground meat act to cement the shorter fibres into longer tendrils. By being careful not to roughly press or pull the meat these forming tendrils are not ruptured and they continue to grow. It has been noted that the ground fatless mass is dark red in color and that it becomes brighter and lighter red in color probably due to oxidation of newly exposed blood and the changing texture of the meat mass.

Now the mixed meat mass is separated into individual portions preliminary to further processing. This can effectively be done in an ordinary hamburger patty making machine, or manually. Such a machine automatically delivers substantially circular flat patty-like portions of predetermined weight and size, and is adjustable to produce various weights and sizes, without crushing or destroying the formed tendril structure.

These portions are now subjected to a rebuilding step made up of combined localized compression and folding operations that result in the final steak product. In this process step the flat meat portion or cake is first subjected to localized compression at a plurality of narrow separated areas. This is usually accomplished with dull bladed tools that compress and interlock the overlapping and adjacent tendrils together at those areas without severing or rupturing the tendril structure. We have found that a so-called cube steak machine modified to use very dull blades instead of the usual sharp knives employed in tenderizing natural cut steaks is satisfactory. If sharp or cutting blades are used the patty is merely cut or torn into smaller pieces and reduced again to hamburger. These dull blades act on both sides of the meat portion at the same time and result in criss-cross or grid-like surface indentation patterns. This part of the process is referred to herein as localized compression of the meat portion.

After such a localized compression operation the portion is folded over to double thickness and subjected to a further similar localized compression operation, then folded over and subjected to further similar localized compression. Using the machine the portion is run through each time it is folded, and normally it takes about five passes through the machine to attain a final steak product of suitable texture and appearance. For the last pass through the machine we may fold and refold the portion several times and determine the desired final size and shape, so that as it comes out upon the final pass it is a rectangular steak product of substantially uniform thickness except of course for the surface indentations.

The machine used in this part of the process for localized compression of the portions may be like that shown in Minder Patent No. 2,673,156 except that our blades are dull instead of sharp as in Minder.

The final steak product is now essentially attained. During the gentle mixing that resulted in formation of the tendril structure the tendrils were stretched somewhat probably due to the manner of their formation. In the localized compression and folding operation these intermingled stretched tendrils are locally attached to each other in what might practically be called a knitting or weaving action whereby the intermingled tendrils are bound together at many spaced areas, and this results in a structure having excellent coherence that may be handled and cooked like a natural steak.

The process so far is preferably carried out at room temperature usually above 50° F.

After the final pass through the dull blade compression machine, the steak produce is wrapped and stored under refrigeration, usually below 50° F. and preferably about 36° F. We have found that such refrigeration is important because in a cold atmosphere the steak product tendrils seem to contract and further knit and set the steak product structure, and actually the surface indentations come together or grow so small that the surface appearance approximates that of natural steak. We have found that if our steak products are left at room temperature, or above 50° F., they may come apart and fail to set, so that as a practical matter it is essential to keep the final product cold, the degree of cold varying somewhat according to the nature of the beef, but the usual refrigeration temperatures for beef are quite adequate.

A set steak product of the invention, upon inspection, gives no indication that it is made of hamburger grind. It appears more natural although close inspection detects the intermingled woven and knitted tendril structure. It may be cooked like a natural cut steak or Swiss steak without destroying its compact coherent structure, and it cuts clean and without tearing in the raw and cooked conditions.

The invention may be embodied in other specific forms without departing from the spirit of essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. The process of making a tender steak product from natural raw beef which comprises grinding a quantity of said natural raw beef and forming the ground beef by extrusion to provide a loose mass of small fragments of said beef, working the mass gently and without exerting substantial pressure thereupon until series of said fragments combine with each other to form tendrils and a stringy more coherent structure results, dividing the worked mass into individual substantially flat portions, subjecting each said portion to repeated localized compression operations at a large number of spaced relatively small areas to effectively bind together said tendrils at said areas while folding the portion between each such compression operation, and maintaining the resultant steak product sufficiently cold to prevent subsequent separation of the tendrils.

2. The process of making a tender steak product from natural raw beef which comprises grinding a quantity of said natural raw beef and forming the ground beef by extrusion to provide a loose mass of small bits of beef, working the mass gently and without exerting substantial pressure thereon until series of said bits of beef combine with each other to form a tendril structure and effectively entangle said tendrils and a stringy more coherent mass is produced, dividing the worked mass into individual flat portions, subjecting each said portion to repeated compression operations along spaced substantially linear areas to effectively bind together the tendrils at said areas with intervening folding operations, and maintaining the resultant steak product sufficiently cold to prevent subsequent separation of the tendrils.

3. The process of making a tender steak product from natural raw beef which comprises grinding a quantity of said natural raw beef to provide a loose mass of small beef bits, working the mass gently and without exerting substantial pressure thereon until said bits combine to form elongated tendrils and effectively entangle said tendrils until a stringy more coherent mass is produced, dividing the worked mass into individual flat portions, subjecting each said portion to repeated localized compression operations to effectively bind together the tendrils with intervening folding operations, and maintaining the resultant steak product sufficiently cold to prevent subsequent separation of the tendrils.

4. The process of making a tender steak product from natural raw beef which comprises grinding a quantity of said natural raw beef and forming the ground beef by extrusion to provide a loose mass of raw beef fragments, working the mass gently and without exerting substantial pressure thereon to thoroughly mix said fragments until series of said fragments combine with each other to provide a definite tendril structure and until a stringy more coherent mass is produced, dividing the worked mass into individual flat portions, subjecting each said portion to repeated localized compression operations to effectively bind together the tendrils with intervening folding operations, and maintaining the resultant steak product sufficiently cold to prevent subsequent separation of the tendrils.

References Cited in the file of this patent

UNITED STATES PATENTS

| | | |
|---|---|---|
| 1,943,019 | Henney et al. | Jan. 9, 1934 |
| 2,398,636 | Henney et al. | Apr. 16, 1946 |